W. B. MORGAN & H. D. WALLEN, Jr.
Car-Couplings.
No. 146,398. Patented Jan. 13, 1874.
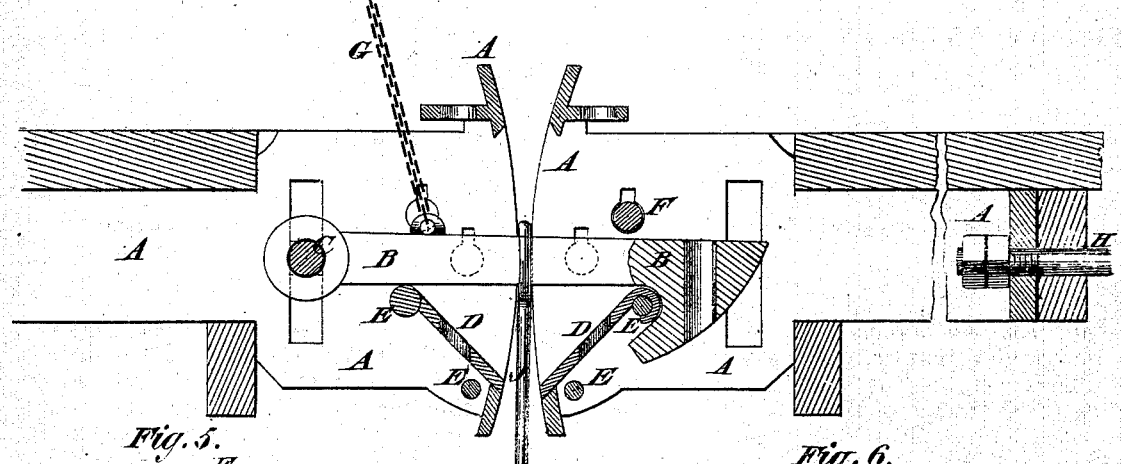
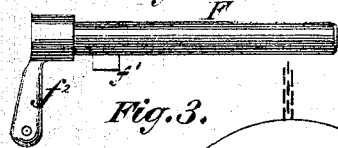
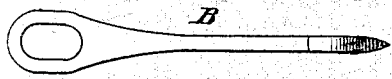
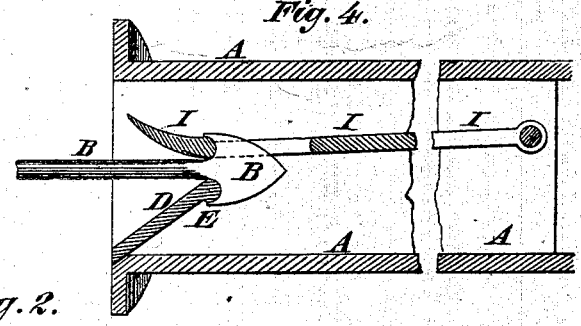
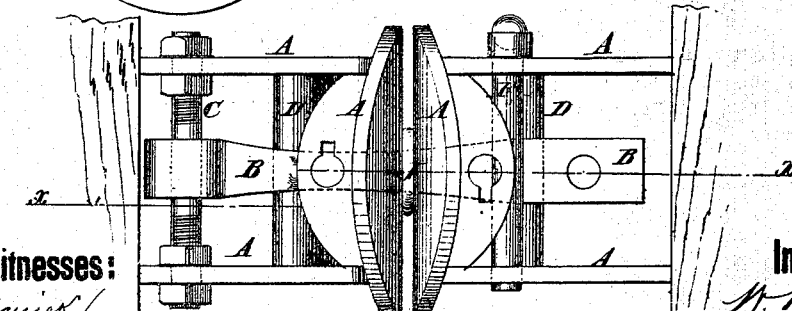

UNITED STATES PATENT OFFICE.

WILLIAM B. MORGAN, OF SHELBY CITY, KENTUCKY, AND HENRY D. WALLEN, JR., OF GRAND RAPIDS, MICHIGAN.

IMPROVEMENT IN CAR-COUPLINGS.

Specification forming part of Letters Patent No. 146,398, dated January 13, 1874; application filed July 12, 1873.

*To all whom it may concern:*

Be it known that we, WILLIAM B. MORGAN, of Shelby City, in the county of Boyle and State of Kentucky, and HENRY D. WALLEN, Jr., of Grand Rapids, in the county of Kent and State of Michigan, have invented a new and useful Improvement in Self-Acting Car-Coupling, of which the following is a specification:

Figure 1 is a vertical longitudinal section of our improved car-coupling, taken through the line *x x*, Fig. 2. Fig. 2 is a top view of the same. Fig. 3 is a front view of one of the bumper-heads, part being broken away to show the construction, and the coupling-hook being shown in section.

The invention will first be fully described, and then pointed out in the claim.

A are the bumper-heads, the forward ends or faces of which are rounded off, as shown in Figs. 1 and 2, and which are made oblong or elliptical in their general form. In the face of the bumper-heads A is formed a high and narrow opening, with straight ends and curved or concaved sides, as shown in Fig. 3. B is the coupling-hook, in one end of which is formed an eye to receive the bolt C, which passes through vertical slots in the sides of the bumper-heads A to pivot the said hook to said bumper-heads. The parts of the bolts C that pass through the slots of the said bumper-heads should be flattened, so that the said bolts cannot turn to work the nuts screwed upon them loose. The bolts C are raised and lowered, to adjust the position of the hook B to the height of the adjacent car, by loosening their nuts and raising or lowering them, as may be required. In the forward lower part of the mouth of the bumper-heads A are formed or secured inclined plates D for the beveled forward end of the hook B to strike against and slide up as the cars are run together.

Having thus described our invention, we claim as new and desire to secure by Letters Patent—

The slotted bumper-heads A and the adjustable bolts C, for connecting the coupling-hooks B adjustably with said bumper-heads, substantially as shown and described.

WILLIAM B. MORGAN.
HENRY D. WALLEN, JR.

Witnesses for H. D. WALLEN, Jr.:
HUGH McCULLOCH, Jr.,
L. E. MULLANY.
Witnesses for W. B. MORGAN:
W. R. DAWSON,
R. H. GRINSTEAD.